United States Patent [19]

Imai

[11] Patent Number: 4,762,960

[45] Date of Patent: Aug. 9, 1988

[54] DEHYDROGENATION CATALYST COMPOSITION AND PARAFFIN DEHYDROGENATION

[75] Inventor: Tamotsu Imai, Mt. Prospect, Ill.

[73] Assignee: UOP Inc., Des Plaines, Ill.

[21] Appl. No.: 84,343

[22] Filed: Aug. 12, 1987

Related U.S. Application Data

[60] Division of Ser. No. 18,541, Feb. 25, 1987, Pat. No. 4,716,143, which is a continuation-in-part of Ser. No. 871,356, Jun. 6, 1986, abandoned.

[51] Int. Cl.$^4$ ............................................. C07C 5/36
[52] U.S. Cl. .................................... 585/660; 585/661; 585/444
[58] Field of Search ............... 502/326, 327, 328, 330, 502/349, 352, 514, 523, 517; 585/444, 660, 661

[56] References Cited

U.S. PATENT DOCUMENTS

| | | | |
|---|---|---|---|
| 3,584,060 | 6/1971 | Rausch | 585/660 |
| 3,632,503 | 11/1972 | Hayes | 585/660 |
| 3,649,566 | 3/1972 | Hayes | 585/660 |
| 3,682,838 | 8/1972 | Block | 585/660 |
| 3,755,481 | 8/1973 | Hayes | 585/660 |
| 3,761,531 | 9/1973 | Block | 585/660 |
| 3,816,344 | 6/1974 | Shimizu et al. | 585/660 |
| 3,878,131 | 4/1975 | Hayes | 585/660 |
| 4,082,696 | 4/1978 | Robinson | 585/660 |
| 4,255,253 | 3/1981 | Herrington et al. | 585/660 |
| 4,409,417 | 10/1983 | Herbstman | 585/660 |
| 4,515,905 | 5/1985 | Uyerhoeven et al. | 502/309 |
| 4,547,486 | 10/1985 | Shyr | 502/333 |
| 4,595,673 | 6/1986 | Imai et al. | 502/227 |
| 4,608,360 | 8/1986 | Abrevaya et al. | 502/226 |
| 4,677,237 | 6/1987 | Imai et al. | 585/444 |
| 4,716,143 | 12/1987 | Imai | 502/326 |

*Primary Examiner*—Asok Pal
*Attorney, Agent, or Firm*—Thomas K. McBride; John F. Spears, Jr.

[57] ABSTRACT

A novel catalytic composite comprising a platinum group metal component; a modifier metal component selected from the group consisting of a tin component, germanium component, rhenium component and mixtures thereof; an alkali or alkaline earth metal component or mixtures thereof, an optional halogen component, and an optional catalytic modifier component on a refractory oxide support having a nominal diameter of at least about 850 microns. The distribution of the platinum group metal component is such that the platinum group component is surface-impregnated where substantially all of the platinum group metal component is located at most within a 400 micron exterior layer of the support. The effective amount of the modifier metal component may be uniformly impregnated throughout the refractory oxide support, surface-impregnated, or located in any other appropriate fashion. The distribution of the surface-impregnated modifier metal component is such that the modifier metal component is substantially all located at most within a 400 micron exterior layer of the support. The novel catalyst has particular utility as a hydrocarbon dehydrogenation catalyst. A method of preparing the catalyst is also disclosed.

8 Claims, 4 Drawing Sheets

DEHYDROGENATION CATALYST COMPOSITION AND PARAFFIN DEHYDROGENATION

CROSS-REFERENCE TO RELATED APPLICATION

This application is a Divisional application of prior copending application Ser. No. 018,541 filed Feb. 25, 1987 now U.S. Pat. No. 4,716,143 which is a continuation-in-part of prior copending application Ser. No. 871,356 filed June 6, 1986, now abandoned, the contents of which are incorporated herein by reference thereto.

BACKGROUND OF THE INVENTION

This invention relates to the conversion of hydrocarbons, especially the dehydrogenation of dehydrogenatable hydrocarbons, in the presence of a catalyst composite. This invention also pertains to a new catalyst composite and a method of making it.

The dehydrogenation of hydrocarbons is an important commercial process because of the great demand for dehydrogenated hydrocarbons for the manufacture of various chemical products such as detergents, high octane gasolines, pharmaceutical products, plastics, synthetic rubbers, and other products well known to those skilled in the art. One example of this process is dehydrogenating isobutane to produce isobutylene which can be polymerized to provide tackifying agents for adhesives, viscosity-index additives for motor oils and impact-resistant and anti-oxidant additives for plastics.

INFORMATION DISCLOSURE

Numerous catalytic composites comprising a platinum group component and a modifier metal component selected from the group consisting of a tin component, germanium component, rhenium component, and mixtures thereof are known. For example related U.S. Pat. Nos. 3,632,503, 3,755,481, and 3,878,131 disclose catalysts comprising a platinum group component, a tin component, and a germanium component on a porous carrier material. However, these references disclose that best results are achieved when a germanium component is uniformly distributed throughout the carrier material. However, the reference is silent as to any advantage to be achieved by limiting the location of substantially all of the catalytic metals to an outer layer of the catalyst particle. In fact, it is indicated in these references that it is preferred that the catalytic composite thereof be subjected to a substantially water-free reduction step prior to its use in the conversion of hydrocarbons. It is further disclosed that the step is designed to ensure a uniform and finely divided dispersion of metallic components throughout the carrier material.

Related U.S. Pat. Nos. 3,682,838 and 3,761,531 disclose catalytic composites comprising a platinum group component, and a Group IVA metallic component. As with the previous references it is disclosed therein that it is preferred that the catalysts are subjected to a reduction step prior to their use. It is further disclosed in these references that the reduction step is designed to assure uniform distribution of the metallic particles throughout the catalysts.

U.S. Pat. Nos. 3,558,477, 3,562,147, 3,584,060, and 3,649,566 all disclose catalytic composites comprising a platinum group component, and a rhenium component on a refractory oxide support. However, as before these references disclose that the best results are achieved when the platinum group component and rhenium component are uniformly distributed throughout the surface and pores of the catalyst.

U.S. Pat. No. 3,897,368 describes a method for the production of a noble metal catalyst where the noble metal is platinum and the platinum is deposited selectively upon the external surface of the catalyst. However, this disclosure describes the advantages of impregnating only platinum on the exterior layer and utilizes a specific type of surfactant to achieve the surface impregnation of the noble metal. Surprisingly, it has been discovered that by incorporating into the outer layer of the catalyst support substantially all of both a platinum group metal component and a metal component selected from the group comprising tin, germanium, and rhenium, a catalyst displaying improved performance in a dehydrogenation process is obtained.

OBJECTS AND EMBODIMENTS

It is, therefore, an object of the present invention to provide an improved catalytic composite and a method of making the same. A corollary objective is to provide an improved process for the conversion of hydrocarbons especially for the dehydrogenation of hydrocarbons.

Accordingly, in a broad embodiment, the present invention is a catalytic composite comprising a platinum group metal component; a modifier metal component selected from the group consisting of a tin component, germanium component, rhenium component and mixtures thereof; and an alkali metal component, or an alkaline earth metal component or mixtures thereof on a refractory oxide support having a nominal diameter of at least about 850 microns wherein the platinum group component is surface-impregnated upon the refractory oxide support where substantially all of the platinum group component is located within at most a 400 micron wide exterior layer of the support. The effective amount of the modifier metal component may be uniformly impregnated, surface-impregnated, or located in any other appropriate fashion. If the modifier metal component is surface-impregnated, then substantially all of the modifier metal component will be located within at most a 400 micron wide exterior layer of the support.

In an alternative embodiment, the invention is a method of preparing a catalytic composite comprising compositing a platinum group component, a modifier metal component selected from the group consisting of a tin component, germanium component, rhenium component and mixtures thereof and an alkali or alkaline earth metal component on a refractory oxide support having a nominal diameter of at least about 850 microns wherein the platinum group component is surface-impregnated upon the refractory oxide support wherein the platinum group component is substantially all located within at most a 400 micron wide exterior layer of the support and the effective amount of the modifier metal component may be uniformly impregnated, surface-impregnated, or located in any other appropriate fashion.

In yet another embodiment, the invention is a hydrocarbon conversion process comprising the steps of contacting a hydrocarbon at hydrocarbon conversion conditions with a catalytic composite comprising a platinum group metal component; a modifier metal component selected from the group consisting of a tin component, germanium component, rhenium component and mixtures thereof; and an alkali or alkaline earth metal component on a refractory oxide support having a nominal diameter of at least about 850 microns wherein the platinum group component is surface-impregnated and wherein substantially all of the platinum group component is located at most within a 400 micron wide exterior layer of the support and wherein the effective amount of the modifier metal component may be either uniformly impregnated, surface-impregnated, or located in any other appropriate fashion.

In an additional embodiment, any surface-impregnated component can be further characterized as having a concentration on the outside 100 micron layer of the catalyst particle of at least 2 times that of the concentration of the same component in the 200 micron diameter center core of the catalyst.

DETAILED DESCRIPTION OF THE INVENTION

To summarize, the present invention is an improved catalytic composite, method of making the same as well as a process for the use thereof.

An essential feature of the present invention is that a platinum group metal component and optionally, a modifier metal component selected from the group consisting of a tin component, germanium component, rhenium component, and mixtures thereof are surface-impregnated upon a catalytic support material and that substantially all of the platinum group component is located within at most a 400 micron exterior layer of the catalyst support. When a modifier metal component is also surface-impregnated, substantially all of the modifier metal component may be located within at most a 400 micron exterior layer of the catalyst support. It is to be understood that the term "exterior" is defined as the outermost layer of the catalyst particle. By "layer", it is meant a stratum of substantially uniform thickness.

A metal component is considered to be surface-impregnated when the average concentration of said metal component within the 100 micron exterior layer of the catalyst is at least about two times the average concentration of the same metal component in the 200 micron diameter center core of the catalyst. In addition to the platinum group component and optionally the modifier metal component being surfaceimpregnated, it is also an aspect of this invention that substantially all of the platinum group component, and modifier metal component when it is surface-impregnated are located within at most the 400 micron exterior layer of the catalyst support. By "substantially all", it is meant at least about 75% of the surface-impregnated component in question. This characterization of the catalytic composite is intended to describe a platinum group metal concentration and an optionally surface-impregnated modifier metal concentration gradient upon and within the catalyst support. The concentration of the platinum group component or optionally surface-impregnated modifier component within the 100 micron layer surface of the support is as stated at least twice that of the platinum group component or the modifier metal component concentration within the 200 micron in diameter center of the catalyst. The surface-impregnated metals concentration then tapers off as the center of the support is approached. The actual gradient of the platinum group metal or the optionally surface-impregnated modifier metal component within the catalyst support varies depending upon the exact manufacturing method employed to fabricate the catalyst. Therefore distribution of the platinum group metal component and the optionally surface-impregnated modifier metal component is best defined as being both surface-impregnated and substantially all located within at most the 400 micron exterior layer of the support where "substantially all" is meant at least about 75% of the component.

As previously stated, the support material has a nominal diameter of 850 microns. For a catalyst support material which approaches this diameter, the exterior layer wherein 75% of the surfaceimpregnated components are located will approach 100 microns. The exterior layer wherein 75% of the surface-impregnated components are located will approach a maximum value of 400 microns as the diameter of the catalyst support increases beyond 2000 microns.

Although it is not understood completely, it is believed that by restricting substantially all of the surface-impregnated components to at most a 400 micron wide exterior layer of the catalyst support, more facile access to these catalytic sites is achieved, allowing the hydrocarbon reactants and products much shorter diffusion paths. By decreasing the length of the diffusion paths the reactants and products have a shorter residence time in the catalyst particle thereby lessening the likelihood of undesirable side reaction due to secondary reactions. This results in an increase in selectivity to the desired product. For example, in the dehydrogenation of a paraffin to a monoolefin, reducing the length of the diffusion path decreases the chances of dehydrogenating the desired monoolefin consecutively to undesirable skeletal isomers, cracked products, and aromatics by their readsorption onto a catalytic site before they can exit the catalyst particle.

A third essential feature of the present invention is a modifier metal component selected from the group consisting of a tin component, germanium component, a rhenium component, and mixtures thereof. As heretofore indicated, the effective amount of the modifier metal component may be uniformly impregnated, surface-impregnated, or located in any other appropriate fashion. When the modifier metal component is surface-impregnated, it may be substantially all located within at most a 400 micron wide exterior layer of the catalyst support particle. Generally the catalyst will comprise from about 0.01 to about 10 wt. % modifier metal component calculated on an elemental basis on the weight of the final composite. Preferably, the catalyst will comprise from about 0.1 to about 5 wt. % modifier metal component.

When the modifier metal component of the present invention comprises a germanium component, all of the germanium component may be present in the catalyst in an oxidation state above that of the elemental metal. This component may exist within the composite as a compound such as the oxide, sulfide, halide, oxychloride, aluminate, etc., or in combination with the carrier material or other ingredients of the composite. Preferably, the germanium component is used in an amount sufficient to result in the final catalytic composite containing, on an elemental basis, about 0.01 to about 10 wt. % germanium, with best results typically obtained with about 0.1 to about 5 wt. % germanium.

Alternatively, the modifier metal component may comprise a tin component. This component may be present as an elemental metal, as a chemical compound such as the oxide, sulfide, halide, oxychloride, etc., or is physical or chemical combination with the porous carrier material and/or other components of the catalytic composite. The tin component is preferably utilized in an amount sufficient to result in a final catalytic composite containing about 0.01 to about 10 wt. % tin, calculated on an elemental basis, with best results obtained at a level of about 0.1 to about 5 wt. %.

Yet another alternative modifier metal component may comprise a rhenium component. This component may be present as an elemental metal, as a chemical compound such as the oxide, sulfide halide, etc., or as a physical or chemical combination with the porous carrier material and/or other components of the catalytic composite. The rhenium component is preferably utilized in an amount sufficient to result in a final catalytic composite containing about 0.01 to about 5 wt. % rhenium, calculated on an elemental basis.

Regarding the preferred amounts of the various modifier metal components of the subject catalyst, it has been found it to be a good practice to specify the amounts of the rhenium component, the germanium component, and the tin component as a function of the amount of the platinum group component. On this basis, the amount of the rhenium component is ordinarily selected so that the atomic ratio of the platinum group metal to rhenium contained in the composite is about 0.05:1 to about 2.75:1, with the preferred range being about 0.25:1 to about 2:1. Similarly, the amount of the tin component is ordinarily selected to produce a composite containing an atomic ratio of the platinum group metal to tin of about 0.1:1 to about 5:1 with the preferred range being about 0.5:1 to about 3:1. The amount of the germanium component is ordinarily selected to produce a composite containing an atomic ratio of germanium to platinum group metal of about 0.25:1 to about 5:1.

The platinum group metal and modifier metal components may be incorporated into the catalytic composite of the invention by any means suitable to result in surface impregnation of the platinum group metal and if desired the surface-impregnation of the modifier metal components wherein substantially all of the surface-impregnated modifier metal components may be located within at most a 400 micron wide exterior layer of the catalyst support particle.

A preferred method of surface impregnating the platinum group component and optionally the modifier metal component is by means of a low acid impregnation utilizing a solution of a soluble, decomposable complex compound of the platinum group component and the desired modifier metal component. In general the solvent used in this impregnation step is selected on the basis of its capability to dissolve the desired decomposable complex compound and is a low acid, preferably aqueous solution. By low acid it is meant that the impregnation solution generally has a normality of 2 or less. An HCl solution is preferred. Nitric acid and the like also can be used.

Typical of some of the water soluble, decomposable platinum group compounds which may be employed in preparing the catalyst of the invention are chloroplatinic acid, ammonium chloroplatinate, bromoplatinic acid, platinum dichloride, platinum tetrachloride hydrate, platinum dichlorocarbonyl dichloride, dinitrodiaminoplatinum, palladium chloride, palladium chloride dihydrate, palladium nitrate, etc. Chloroplatinic acid is preferred as a source of platinum.

Germanium compounds which may be used include germanium oxide, germanium tetraethoxide, germanium tetrapropoxide, germanium tetrachloride, germanium difluoride, germanium tetrafluoride, germanium di-iodide, germanium monosulfide and the like compounds. One particularly preferred impregnation solution comprises nascent germanium metal dissolved in chlorine water to yield a germanium oxychloride. A second preferred impregnation solution comprises germanium tetrachloride dissolved in anhydrous ethanol.

Suitable tin salts or water-soluble compounds of tin which may be used include stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and the like compounds. The utilization of a tin chloride compound, such as stannous or stannic chloride is particularly preferred.

Typical of rhenium compounds which may be used are ammonium perrhenate, sodium perrhenate, potassium perrhenate, and the like salts. In addition, solutions of rhenium halides such as rhenium chloride may be used; the preferred impregnation solution is, however, an aqueous solution of perrhenic acid.

The platinum group component and modifier metal component may be composited with the support in any sequence. Thus, the platinum group component may be impregnated on the support followed by sequential surface or uniform impregnation of one or more modifier metal components. Alternatively, the modifier metal component or components may be surface or uniformly impregnated on the support followed by impregnation with the platinum group component. It is also contemplated that the platinum group component and modifier metal component may be surface-impregnated upon a refractory oxide support throughout which the modifier metal component is uniformly located.

As indicated above, the present invention involves use of a catalytic composite containing an alkali metal component, or an alkaline earth metal component or mixtures thereof. More specifically, this component is selected from the group consisting of the compounds of the alkali matals--cesium, rubidium, potassium, sodium, and lithium--and of the alkaline earth metals--calcium, strontium, barium, magnesium and beryllium. This component may exist within the catalytic composite as a relatively stable compound such as the oxide or sulfide or in combination with one or more of the other components of the composite, or in combination with an alumina carrier material such as in the form of a metal aluminate. Since, as is explained hereinafter, the composite containing the alkali or alkaline earth metal component is always calcined in an air atmosphere before use in the conversion of hydrocarbons, the most likely state this component exists in during use in dehydrogenation is the metallic oxide. Regardless of what precise form in which it exists in the composite, the amount of this component utilized is preferably selected to provide a composite containing about 0.01 to about 10 wt. % of the alkali or alkaline earth metal, and more preferably about 0.05 to about 5 wt. %. The alkali or alkaline earth component is preferably but not necessarily uniformly distributed throughout the catalyst particle. Best results are ordinarily achieved when this component is a compound of lithium, potassium, cesium, or mixtures thereof.

This alkali or alkaline earth metal component may be combined with the porous carrier material in any manner known to those skilled in the art such as by impregnation, coprecipitation, physical admixture, ion exchange, etc. However, the preferred procedure involves impregnation of the carrier material either before or after it is calcined and either before, during, or after the other components are added to the carrier material. Best results are ordinarily obtained when this component is added after the platinum group component and modifier metal component because it serves to neutralize the acid used in the preferred impregnation procedure for incorporation of these components. Typically, the impregnation of the carrier material is performed by contacting same with a solution of a suitable, decomposable compound or salt of the desired alkali or alkaline earth metal. Hence, suitable compounds include the halides, sulfates, nitrates, acetates, carbonates, and the like compounds. For example, excellent results are obtained by impregnating the carrier material after the platinum group component has been combined therewith with an aqueous solution of lithium nitrate or potassium nitrate.

The catalytic composite of the present invention may also contain a halogen component. The halogen component may be either fluorine, chlorine, bromine or iodine or mixtures thereof. Chlorine and bromine are the preferred halogen components. The halogen component is generally present in a combined state with the porous carrier material and alkali component. Although not essential to the invention, the halogen component is preferably well dispersed throughout the catalytic composite. The halogen component may comprise from more than 0.2 to about 15 wt. %, calculated on an elemental basis, of the final catalytic composite.

The halogen component may be incorporated in the catalytic composite in any suitable manner, either during the preparation of the carrier material or before, while or after other catalytic components are incorporated. For example, the alumina sol utilized to form the preferred aluminum carrier material may contain halogen and thus contribute at least some portion of the halogen content in the final catalyst composite. Also, the halogen component or a portion thereof may be added to the catalyst composite during the incorporation of the carrier material with other catalyst components, for example, by using chloroplatinic acid in impregnating a platinum component. Also, the halogen component or a portion thereof may be added to the catalyst composite by contacting the catalyst with the halogen or a compound, solution, suspension or dispersion containing the halogen before or after other catalyst components are incorporated with the carrier material. Suitable compounds containing the halogen include acids containing the halogen, for example, hydrochloric acid. Or, the halogen component or a portion thereof may be incorporated by contacting the catalyst with a compound, solution, suspension or dispersion containing the halogen in a subsequent catalyst regeneration step.

Optionally, the catalyst of the present invention may also contain a sulfur component. Generally, the sulfur component may comprise about 0.01 to 2 wt. %, calculated on an elemental basis, of the final catalytic composite. The sulfur component may be incorporated into the catalytic composite in any suitable manner. Preferably, sulfur or a compound containing sulfur such as hydrogen sulfide or a lower molecular weight mercaptan, for example, is contacted with the catalyst composite in the presence of hydrogen at a hydrogen to sulfur molar ratio of about 100 and a temperature of from about 10° to about 540° C., preferably under water-free conditions, to incorporate the sulfur component.

Optionally, the catalyst may also contain other, additiona components or mixtures thereof which act alone or in concert as catalyst modifiers to improve catalyst activity, selectivity or stability. The catalyst modifiers are preferably but not necessarily dispersed throughout the catalyst particle in a uniform distribution. Some well-known catalyst modifiers include antimony, arsenic, bismuth, cadmium, chromium, cobalt, copper, gallium, gold, indium, iron, manganese, nickel, scandium, silver, tantalum, thallium, titanium, tungsten, uranium, zinc, and zirconium. A component selected from the group consisting of a thallium component, gallium component and indium component is preferred. These additional components may be added in any suitable manner to the carrier material during or after its preparation, or they may be added in any suitable manner to the catalytic composite either before, while or after other catalytic components are incorporated.

Preferably, the catalyst of the present invention is nonacidic. "Nonacidic" in this context means that the catalyst has very little skeletal isomerization activity., that is, the catalyst converts less than 10 mole % of butene-1 to isobutylene when tested at dehydrogenation conditions and, preferably, converts less than 1 mole %. The acidity of the catalyst can be decreased if necessary to make the catalyst nonacidic by increasing the amount of the alkali component within the claimed range, or by treating the catalyst with steam to remove some of the halogen component.

After the catalyst components have been combined with the porous carrier material, the resulting catalyst composite will generally be dried at a temperature of from about 100° to about 320° C. for a period of typically about 1 to 24 hours or more and thereafter calcined at a temperature of about 320° to about 600° C. for a period of about 0.5 to 10 or more hours. Finally, the calcined catalyst composite is typically subjected to a reduction step before use in the hydrocarbon conversion process. This reduction step is effected at a temperature of about 100° to about 650° C. for a period of about 0.5 to about 10 or more hours in a reducing environment, preferably dry hydrogen, the temperature and time being selected to be sufficient to reduce substantially all of the platinum group component to the elemental metallic state.

Regarding the refractory oxide support, it is preferably a porous, absorptive support with high surface area of from about 5 to about 500 m$^2$/g. The porous carrier material should be relatively refractory to the conditions utilized in the hydrocarbon conversion process. It is intended to include within the scope of the instant invention the use of carrier materials which have traditionally been utilized in hydrocarbon conversion catalysts such as, for example (1) activated carbon, coke, or charcoal; (2) silica or silica gel, silicon carbide, clays, and silicates, including synthetically prepared and naturally occurring ones, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, beryllium oxide, vanadium oxide, cerium oxide, hafnium oxide, zinc oxide, magnesia, boria, thoria, silica-alumina, silica-magnesia, chromia-alumina, alumina-boria, silica-zirconia. etc.; (5) crystalline zeolitic aluminosilicates such as naturally occurring or synthetically prepared mordenite and/or faujasite, for example, either in the hydrogen form or in a form which has been exchanged with metal cations, (6) spinels such as $MgAl_2O_4$, $FeAl_2O_4$, $ZnAl_2O_4$, $CaAl_2O_4$, and other like compounds having the formula $MO-Al_2O_3$ where M is a metal having a valence of 2; and (7) combinations of materials from one or more of these groups. The preferred carrier material for the instant catalyst is alumina, especially gamma- or eta-alumina.

As heretofore indicated, the oxide support of the present invention has a nominal diameter of at least about 850 microns. By nominal diameter, it is meant that the particle must be no less than about 850 microns thick at its narrowest or nominal dimension. Thus if the particle is spherical, it must have a diameter of at least about 850 microns while if it is cylindrical (as might be in the case of an extrudate), the diameter of the circular cross section must be at least about 850 microns and the length of the cylinder must be at least about 850 microns. Likewise if the particle shape of the extrudate is a cube or elongated box, no side or height may be less than about 850 microns. As set forth above, it is believed that by limiting the surface-impregnated platinum group component and the optionally surface-impregnated modifier metal component to at most a 400 micron exterior layer, diffusion paths are minimized and selectivity to the desired products is maximized. It would thus seem logical to decrease the diffusion paths further by reducing the support particle size more to less than 850 microns. However, a reduction in particle size leads to an increase in pressure drop through the catalyst bed and an increase in the problems associated therewith. Accordingly, the limiting of substantially all of the surface-impregnated catalytic species to at most the 400 micron exterior layer while limiting the catalyst particle to a nominal diameter of at least about 850 microns enables the minimization of diffusion paths while maintaining commercially practicable catalyst bed pressure drop and catalyst loading.

The preferred alumina carrier material may be prepared in any suitable manner from synthetic or naturally occurring raw materials. The carrier may be formed in any desired shape such as spheres, pills, cakes, extrudates, etc. A preferred shape of alumina is the sphere. It is essential that the particle size be such that it has a nominal diameter of at least about 850 microns, though particles having a nominal diameter of about 1600 microns are preferred.

To make alumina spheres, aluminum metal is converted into an alumina sol by dissolving it in a suitable acid, and then dropping a mixture of the resulting sol and a gelling agent such as urea into an oil bath to form spherical particles of an alumina gel which are easily converted into the preferred gamma- or eta-alumina carrier material by known methods including aging, drying and calcining. To make alumina cylinders, an alumina powder is mixed with water and enough of a suitably sized die and cut to form extrudate particles. Other shapes of the alumina carrier material may also be prepared by conventional methods. After the alumina particles are shaped, generally they are dried and calcined. The alumina carrier may be subjected to intermediate treatments during its preparation, including washing with water or a solution of ammonium hydroxide, for example, which treatments are well known in the art.

As indicated above, the catalyst of the present invention has particular utility as a hydrocarbon conversion catalyst. The hydrocarbon which is to be converted is contacted with the catalyst at hydrocarbon conversion conditions. These conditions include a temperature of from about 200° to 100° C., a pressure of from atmospheric to about 25 atmospheres gauge and liquid hourly space velocities of from about 0.1 to about 200 $hr^{-1}$.

According to one embodiment of the invention, dehydrogenatable hydrocarbons are contacted with the catalytic composite of the instant invention in a dehydrogenation zone maintained at dehydrogenation conditions. This contacting may be accomplished in a fixed catalyst bed system, a moving catalyst bed system, a fluidized bed system, etc., or in a batch-type operation. A fixed bed system is preferred. In this fixed bed system the hydrocarbon feed stream is preheated to the desired reaction temperature and then passed into the dehydrogenation zone containing a fixed bed of the catalyst. The dehydrogenation zone may itself comprise one or more separate reaction zones with heating means therebetween to ensure that the desired reaction temperature can be maintained at the entrance to each reaction zone. The hydrocarbon may be contacted with the catalyst bed in either upward, downward or radial flow fashion. Radial flow of the hydrocarbon through the catalyst bed is preferred for commercial scale reactors. The hydrocarbon may be in the liquid phase, a mixed vapor-liquid phase or the vapor phase when it contacts the catalyst. Preferably, it is in the vapor phase.

Hydrocarbons which may be dehydrogenated include dehydrogenatable hydrocarbons having from 2 to 30 or more carbon atoms including paraffins, alkylaromatics, naphthenes and olefins. One group of hydrocarbons which can be dehydrogenated with the catalyst is the group of normal paraffins having from 2 to 30 or more carbon atoms. The catalyst is particularly useful for dehydrogenating paraffins having from 2 to 15 or more carbon atoms to the corresponding monoolefins or for dehydrogenating monoolefins having from 3 to 15 or more carbon atoms to the corresponding diolefins.

Dehydrogenation conditions include a temperature of from about 400° to about 900° C., a pressure of from about 0.01 to 10 atmospheres and a liquid hourly space velocity (LHSV) of from about 0.1 to 100 $hr^{-1}$. Generally for normal paraffins the lower the molecular weight the higher the temperature required for comparable conversion. The pressure in the dehydrogenation zone is maintained as low as practicable, consistent with equipment limitations, to maximize the chemical equilibrium advantages.

The effluent stream from the dehydrogenation zone generally will contain unconverted dehydrogenatable hydrocarbons, hydrogen and the products of dehydrogenation reactions. This effluent stream is typically cooled and passed to a hydrogen separation zone to separate a hydrogen-rich vapor phase from a hydrocarbon-rich liquid phase. Generally, the hydrocarbon-rich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds.

The dehydrogenatable hydrocarbons may be admixed with a diluent material before, while or after being passed to the dehydrogenation zone. The diluent material may be hydrogen, steam, methane, ethane, carbon dioxide, nitrogen, argon and the like or a mixture thereof. Hydrogen is the preferred diluent. Ordinarily, when hydrogen is utilized as the diluent it is utilized in amounts sufficient to ensure a hydrogen to hydrocarbon mole ratio of about 0.1:1 to about 40:1, with best results being obtained when the mole ratio range is about 1:1 to about 10:1. The diluent hydrogen stream passed to the dehydrogenation zone will typically be recycled hydrogen separated from the effluent from the dehydrogenation zone in the hydrogen separation zone.

Water or a material which decomposes at dehydrogenation conditions to form water such as an alcohol, aldehyde, ether or ketone, for example, may be added to the dehydrogenation zone, either continuously or intermittently, in an amount to provide, calcUlated on the basis of equivalent water, about 1 to about 20,000 weight ppm of the hydrocarbon feed stream. About 1 to about 10,000 weight ppm of water addition gives best results when dehydrogenating paraffins having from 6 to 30 or more carbon atoms.

To be commercially successful, a dehydrogenation catalyst should exhibit three characteristics, namely high activity, high selectivity and good stability. Activity is a measure of the catalyst's ability to convert reactants into products at a specific set of reaction conditions, that is, at a specified temperature, pressure, contact time and concentration of diluent such as hydrogen, if any. For dehydrogenation catalyst activity, the conversion or disappearance of paraffins in percent relative to the amount of paraffins in the feedstock was measured. Selectivity is a measure of the catalyst's ability to convert reactants into the desired product or products relative to the amount of reactants converted. For catalyst selectivity, the amount of olefins in the product, in mole percent, relative to the total moles of the paraffins converted was measured. Stability is a measure of the rate of change with time on stream of the activity and selectivity parameters - the smaller rates implying the more stable catalysts.

Since dehydrogenation of hydrocarbons is an endothermic reaction and conversion levels are limited by chemical equilibrium, it is desirable in order to achieve high conversion to operate at high temperatures and low hydrogen partial pressures. At such severe conditions, it is difficult to maintain high activity and selectivity for long periods of time because undesirable side reactions such as aromatization, cracking, isomerization and coke formation increase. Therefore, it is advantageous to have a new hydrocarbon dehydrogenation catalyst with improved activity, selectivity and stability characteristics.

The following examples are introduced to further describe the catalyst and process of the invention. The examples are intended as illustrative embodiments and should not be considered to restrict the otherwise broad interpretation of the invention as set forth in the claims appended hereto.

BRIEF DESCRIPTION OF THE DRAWINGS

FIGS. 1 and 2 are graphical representations of the performance in the paraffin dehydrogenation process of Catalyst A, different from the invention, and Catalyst B, in accordance with the invention.

EXAMPLE 1

In order to demonstrate the advantages to be achieved by the present invention, a first control catalyst, different from the invention, was prepared. First, a spherical alumina support was prepared by the well-known oil-drop method. A tin component was incorporated in the support by commingling a tin component precursor with the alumina hydrosol and thereafter gelling the hydrosol. The tin component in this case was uniformly distributed throughout the catalyst particle. The spherical alumina support containing a tin component had a diameter of about 1500 microns. The tin-containing support was then impregnated with an aqueous solution comprising $H_2PtCl_6 + LiNO_3$ and 3.4% $HNO_3$. After impregnation the catalyst was oven-dried at about 150° C. for 2 hours and calcined at about 540° C. for 2.5 hours. Thereafter the catalyst was reduced with hydrogen for about 2 hours at 500° C. This catalyst was designated Catalyst A and comprised about 0.38% platinum, about 0.5% tin, and about 0.6% lithium uniformly distributed throughout the catalyst particle.

EXAMPLE 2

In this example, a second catalyst was prepared in accordance with the invention. 250 cc of a spherical alumina support having a diameter of about 1500 microns was impregnated with an aqueous solution of a Pt(II)-Sn(II) complex prepared by combining $H_2PtCl_6 + SnCl_2$ and 1% HCl. After impregnation the catalyst was oven-dried at about 150° C. for 2 hours and calcined at about 540° C. for about 2½ hours. Thereafter the catalyst was impregnated with an aqueous solution of $LiNO_3$. The catalyst was then again oven-dried at about 150° C. for 2 hours and calcined for about 540° C. for a further 2½ hours. The calcined catalyst was then reduced in hydrogen for about 2 hours at a temperature of 500° C. This catalyst, made in accordance with the invention, was designated Catalyst B. Catalyst B had a final composition of about 0.38% platinum, 0.4% tin, and about 0.6% lithium.

EXAMPLE 3

In this example, Catalysts A and B were evaluated as catalysts for the dehydrogenation of normal paraffins. These tests were carried out in a pilot plant comprising a reactor and product separation facilities. The charge stock has passed into the reaction zone wherein it was contacted with the catalyst. The effluent from the reaction zone was thereafter separated and analyzed. The charge stock comprised on a normalized basis about 11.8 wt. % normal $C_{10}$ paraffins, 26.7 wt. % normal $C_{11}$ paraffins, 34 wt. % normal $C_{12}$ paraffins and 27.5 wt. % normal $C_{13}$ paraffins. The reaction zone was maintained at a pressure of about 20 psig. The charge stock was passed to the reaction zone at a rate sufficient to produce a liquid hourly space velocity of about 70 $hr^{-1}$. Hydrogen diluent was fed to the reaction zone at a rate sufficient to provide a molar hydrogen to hydrocarbon ratio of about 4:1. The feedstock was heated to a temperature of about 495° C. prior to contact with the catalyst. The water content of the reaction zone was maintained at about 2000 ppm by weight.

Figure 1:
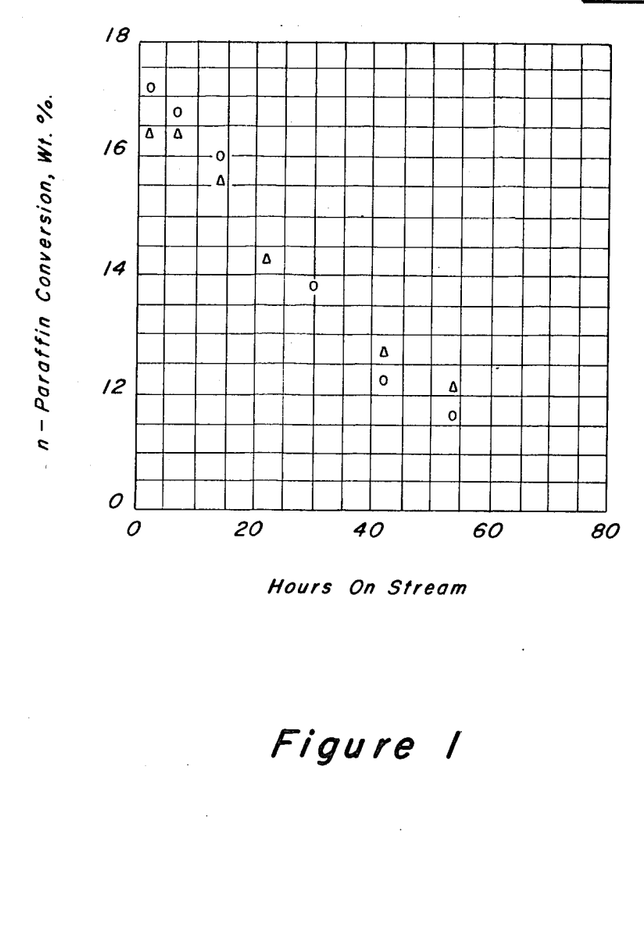
FIG. 1 is a graph of the normal paraffin conversions in weight percent as a function of hours on stream of the test.
Figure 2:
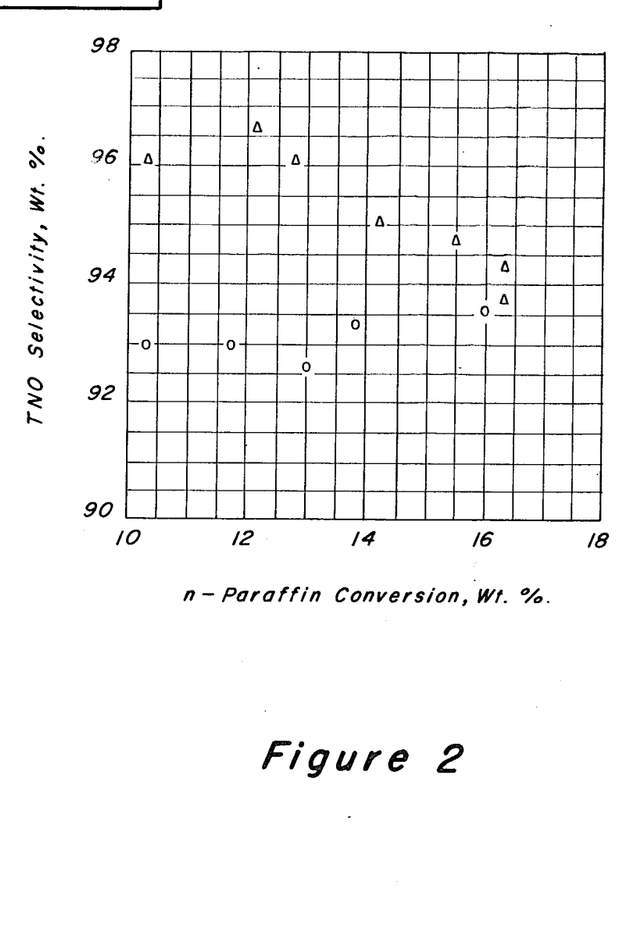
FIG. 2 is a plot of the selectivities of the catalysts in weight percent for producing normal olefins as a function of the normal paraffin conversion in weight percent.

The results of these tests are set forth in FIGS. 1 and 2. FIG. 1 is a graphical depiction of the normal paraffin conversion in weight percent as a function of the number of hours on stream. The normal paraffin conversion is defined as the weight of the components in the fresh feed which actually underwent some reaction divided by the total weight of the feed. In FIG. 1 it can be seen that Catalysts A and B exhibit substantially the same normal paraffin conversion. Fig. 2 is a graphical depiction of the total normal olefin (TNO) selectivity in weight percent as a function of the normal paraffin conversion in weight percent. The total normal olefin selectivity in weight percent is defined as the weight of charge stock components converted to the desired normal olefin product divided by the total number of charge stock components undergoing some reaction. A review of the data depicted in FIG. 2 discloses that Catalyst B of the invention showed higher selectivity for the production of the desired normal olefins than did Catalyst A, different from the invention. It is believed that the higher selectivity exhibited by the catalyst of the invention is a direct result of the platinum and tin being surface-impregnated and also because substantially all of the platinum and tin components are located within at most a 400 micron wide exterior layer of the catalyst particle. By so locating the catalytic metal components, it is believed that the reactant and product diffusion paths are minimized while allowing commercially practicable pressure drops through the reaction zone.

EXAMPLE 4

The catalyst of this example was prepared according to the method set forth in U.S. Pat. No. 3,584,060 (Rausch). This catalyst is different than that of the present invention. To produce the catalyst of this example, a spherical alumina support having a diameter of approximately 1500 microns was prepared by the well known oil drop ethod. An impregnation solution was next prepared by dissolving a small amount of stannic chloride in nitric acid. To this solution was added small amounts of a 3.26 wt. % Re solution of perrhenic acid and a 2.543 wt. % Pt solution of chloroplatinic acid. Water was added to bring the solution weight to 100 grams. The solution was combined with the spherical alumina support mentioned above. The impregnated spheres were dried at 150° C. for 2 hours. The dried spheres were next calcined at 540° C. for 2 hours in air with 10 wt. % steam added followed by calcination for ½ hour at 540° C. under an air atmosphere only.

This impregnation and finishing procedure resulted in a catalyst composite comprising the following levels of catalytically active metals; 0.388 wt. % platinum, 0.423 wt. % rhenium, and 0.366 wt. % tin. This catalyst will hereinafter be referred to as Catalyst C.

EXAMPLE 5

In this example, a catalyst was prepared according to the example set forth in U.S. Pat. No. 3,878,131 (Hayes). This catalyst is not the catalyst of the instant invention. A spherical alumina support approximately 1500 microns in diameter was prepared using the well known oil drop method. An impregnation solution was prepared by dissolving a small amount of stannous chloride in hydrochloric acid and diluting the solution further with water. Germanium tetrachloride dissolved in ethanol was next added to the solution followed by the addition to the solution of a small amount of chloroplatinic acid. The resulting impregnation solution was combined with the catalyst base mentioned above. The impregnated base was next dried for 2 hours at 150° C. The dried, impregnated base was then calcined for 2 hours at 540° C. under an air atmosphere with 10 wt. % steam added, followed by a ½-hour calcination at the same conditions without steam addition.

The resulting catalyst composite was determined by analysis to be comprised of the following amounts of catalytically active metals: 0.389 wt. % platinum, 0.263 wt. % tin; and 0.245 wt. % germanium. This catalyst will hereinafter be referred to as Catalyst D.

EXAMPLE 6

In this example, Catalyst B of the present invention and Catalysts C and D of the prior art were evaluated by Scanning Electron Microscopy (SEM). The purpose of this analysis was to identify the relative distribution of impregnated metals across the radius of a catalyst pill of each example catalyst previously mentioned. Before proceeding, it should be noted that the SEM data does not show the actual level of metals at any one point within the catalyst pill, but indicates only the relative metals distribution profile in relation to the alumina level. In other words, the results of each analysis may not be based upon a zero point and attempting to integrate a distribution curve is not possible and could lead to interpretation errors as the entire curve could be shifted either up or down. Therefore the curves are useful for making relative comparisons of metal distributions only.

Figure 3:
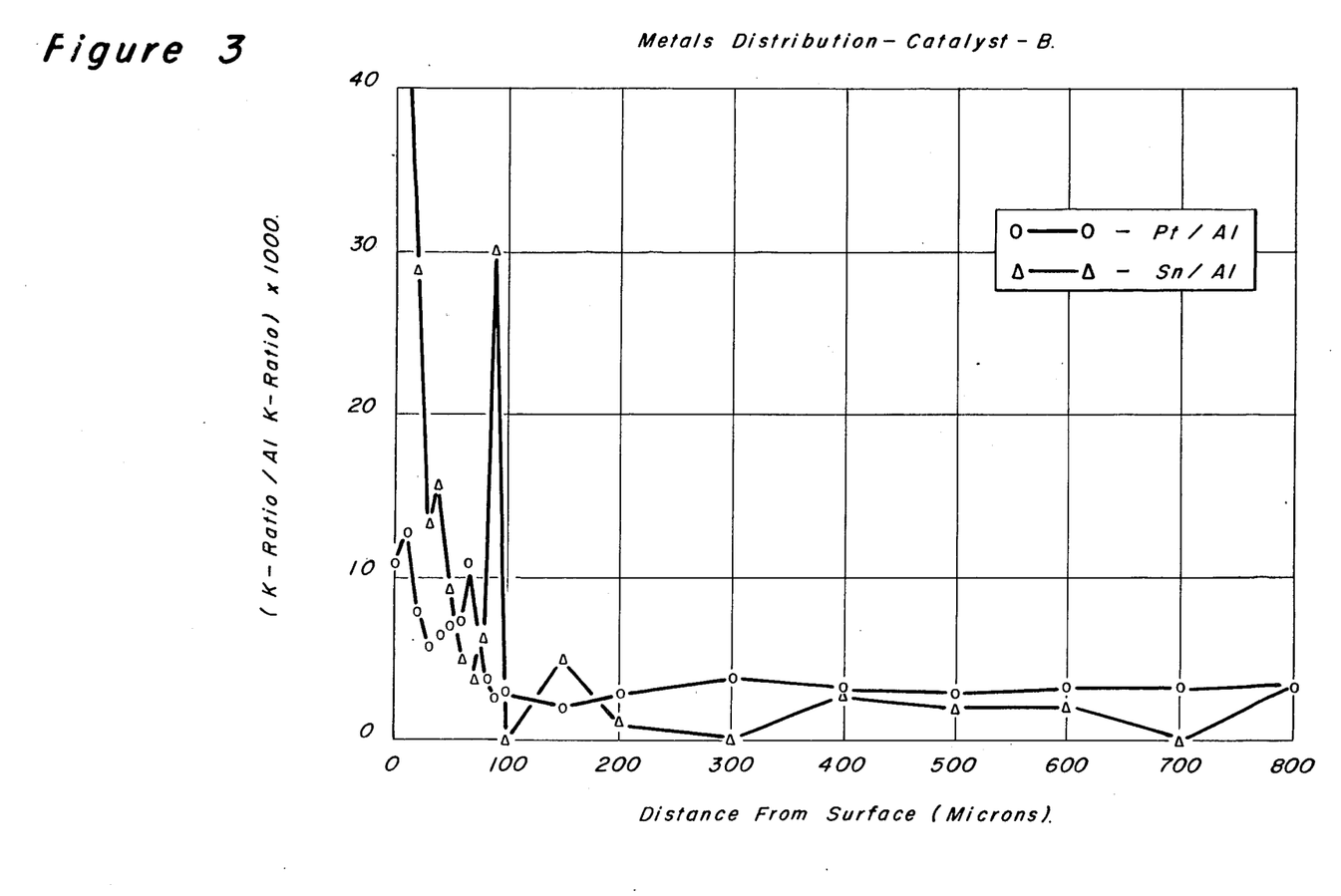
FIGS. 3, 4, and 5 are graphical representations of the platinum group metal and modifier metal gradient across the radius of catalysts of Examples 2, 4, and 5, respectively. The metals distribution is presented as a ratio of a special metal concentration to the alumina concentration plotted against the distance in microns from the surface of the particle. The distributions were determined by scanning electron microscopy (SEM). It should be noted that the plots do not represent actual metal content, but only the relative concentration of the metal across the radius of a catalyst pill.
Figure 4:
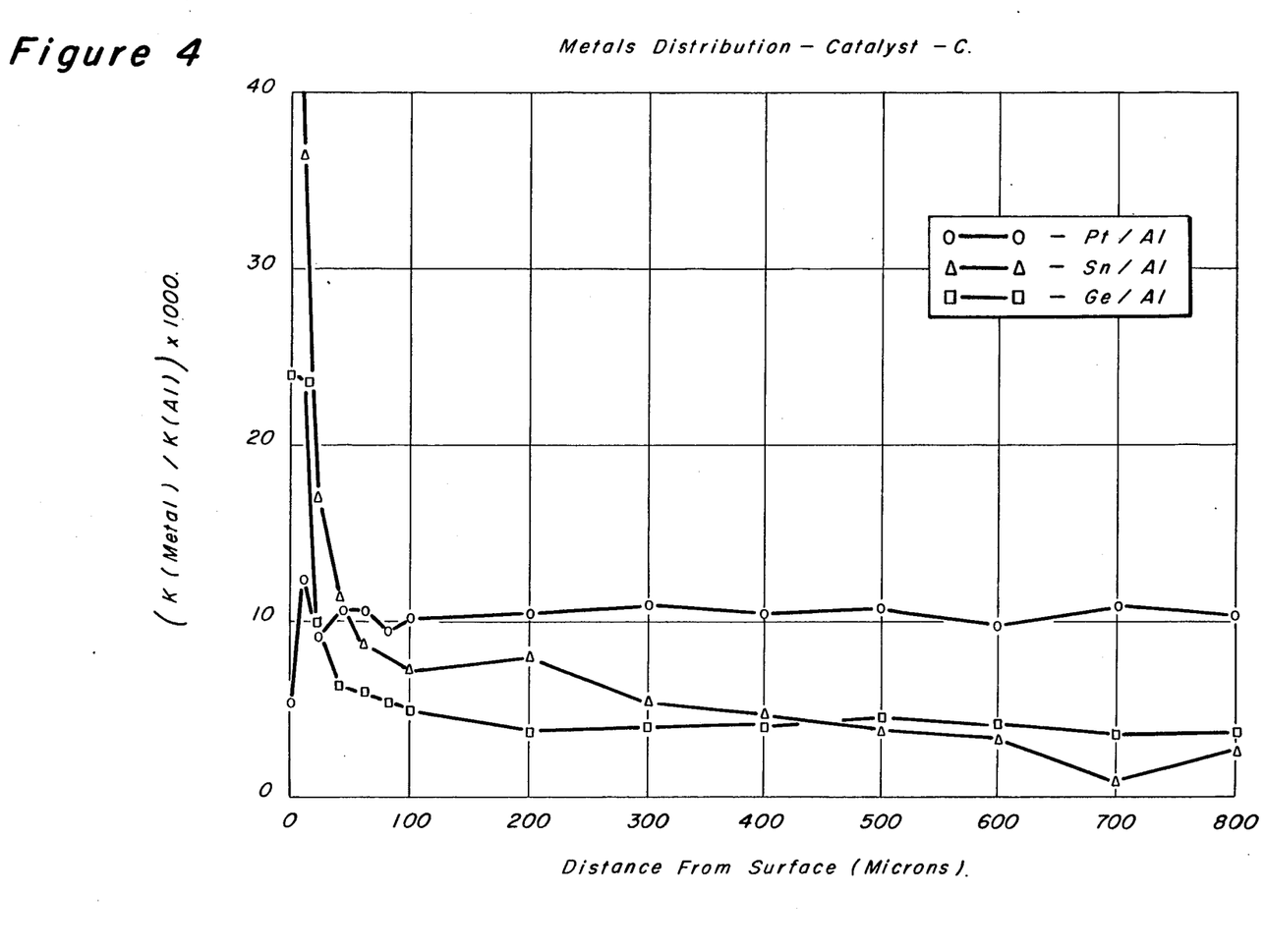
Figure 5:
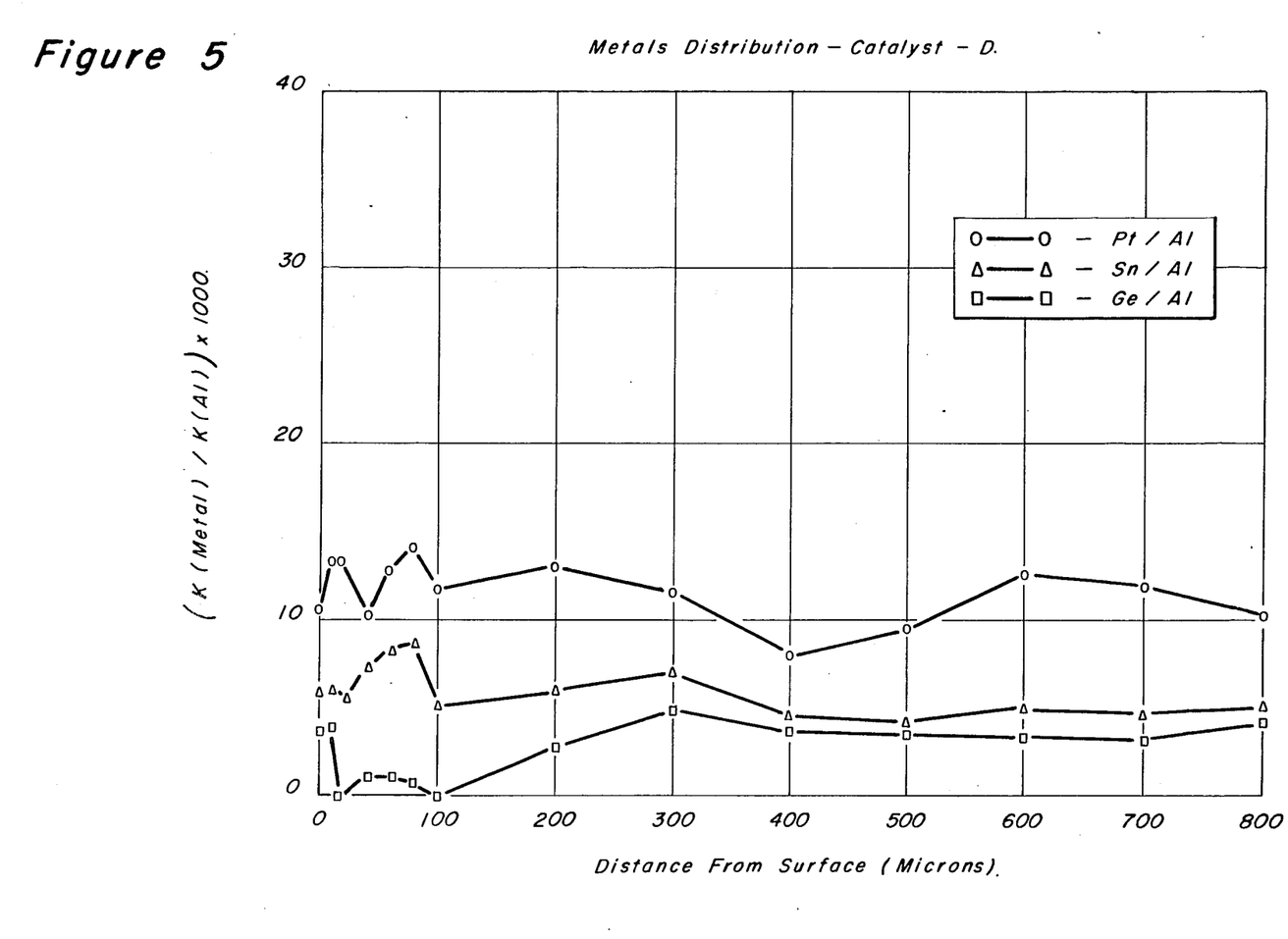

An examination of the platinum levels across the catalyst pills of Catalysts B, C, and D as found in FIGS. 3, 4, and 5 respectively shows the platinum distribution of Catalyst B of the instant invention to be contained essentially within the exterior layer of the catalyst particle. The platinum level begins at a (Pt K-ratio/Al K-ratio)*1000 value of 11 to 12 on the surface of the particle and drops to a value of 3 a distance of 100 microns from the surface of the catalyst support. Catalyst B can therefore be characterized as being surfaceimpregnated with platinum as the concentration of platinum in the 100 micron surface layer is over twice the relative platinum concentration in the 200 micron center core of the catalyst support. This is in contrast to Catalyst C of the prior art which exhibits a constant (Pt K-ratio/Al K-ratio)*1000 value of 10 across the entire radius of the catalyst pill as seen in FIG. 4, and a constant value of about 12 across the catalyst pill for Catalyst D of the prior art as seen in FIG. 5. These two catalysts therefore can be described as being uniformly impregnated with platinum.

The tin component of the instant invention is also surfaceimpregnated. The tin level as seen in FIG. 3 begins at a (Ti K-ratio/Al K-ratio)*1000 value of greater than 40 and drops to a value of almost zero at a distance of 100 microns from the surface of the catalyst particle. The tin component of Catalyst C of the prior art as seen in FIG. 4 is also surface impregnated. As shown earlier however, the platinum component is not surface-impregnated and therefore different than the catalyst of the instant invention. Finally, the tin component distribution of Catalyst D of the prior art is uniformly impregnated as shown in FIG. 5.

What is claimed is:

1. A hydrocarbon dehydrogenation process for enhancing the formation of total normal olefins comprising contacting a hydrocarbon at hydrocarbon conversion conditions with a catalytic composite comprising a platinum group metal component; a modifier metal component selected from the group consisting of a tin component, germanium component, rhenium component, and mixtures thereof; an alkali metal component, or an alkaline earth metal component or mixtures thereof on a refractory oxide support having a nominal diameter of at least about 850 microns wherein the platinum group component and the modifier metal component are surface-impregnated such that the average concentration of the surface-impregnated platinum group metal component and modifier metal component on the outside 100 micron layer of the catalyst particle are each at least 2 times the concentration of the respective platinum group metal component and modifier metal component in the 200 micron diameter center core of the catalyst.

2. The process of claim 1 further characterized in that the platinum group metal component comprises a platinum component.

3. The process of claim 1 further characterized in that the modifier metal component comprises a tin component.

4. The process of claim 1 further characterized in that the alkali or alkaline earth component comprises a lithium component.

5. The process of claim 1 further characterized in that the refractory inorganic oxide comprises alumina.

6. A paraffin dehydrogenation process for enhancing the formation of total normal olefins comprising contacting a hydrocarbon at hydrocarbon conversion conditions with a catalytic composite comprising from about 0.01 to about 2.0 wt. % of a platinum component, from about 0.01 to about 5.0 wt. % of a tin component, and from about 0.01 to about 1.0 wt. % of a lithium component on an alumina support having a nominal diameter of at least about 850 microns wherein the platinum and tin components are surface-impregnated such that the concentration of the surface-impregnated platinum and tin components on the outside 100 micron catalyst layer are each at least 2 times the concentration of the respective platinum and tin components in the 200 micron diameter center core of the catalyst.

7. The process of claim 6 further characterized in that the catalytic composite comprises a halogen component.

8. The process of claim 6 further characterized in that the catalytic composite comprises a catalytic modifier selected from the group consisting of antimony, arsenic, bismuth, cadmium, chromium, cobalt, copper, gallium, gold, indium, iron, manganese, nickel, scandium, silver, tantalum, thallium, titanium, tungsten, uranium, zinc, and zirconium.

* * * * *